United States Patent Office 3,370,113
Patented Feb. 20, 1968

3,370,113
METHOD OF MAKING CARBONACEOUS PRODUCTS
Walter V. Goeddel, Poway, Calif., assignor, by mesne assignments, to Gulf General Atomic Incorporated, San Diego, Calif., a corporation of Delaware
No Drawing. Filed Mar. 12, 1965, Ser. No. 439,461
6 Claims. (Cl. 264—29)

ABSTRACT OF THE DISCLOSURE

A process for making carbonaceous products, such as graphite articles, to accurate dimensional standards. A green article containing particulate carbonaceous material plus a carbonizable binder is placed in a container, such as a porous graphite sleeve, and physically restrained therein without placing the green article under substantial compression, as by using vibration compaction to fill the void region within the container with particulate ceramic material. By heating the green article under this condition for sufficient time to carbonize substantially all of the carbonizable binder, baked articles having true dimensional characteristics to the green articles are produced which baked articles can be subsequently graphitized by known methods without significant change in dimensions.

---

This invention relates to a method of making carbonaceous products, and more particularly to an economical method of making graphite products of complex shapes.

Graphite and other carbonaceous products have long been useful in various applications which take advantage of their inherent resistance to high temperatures. However, one drawback to the use of such products in many applications has been their cost of manufacture, the complete time of which was often measured in weeks. This extended length of time was required to produce carbonaceous products which were free of structural defects.

Graphite products are usually made from a mixture of a carbonaceous material, such as coke, and a carbonizable binder, such as coal tar pitch. In conventional methods of manufacture, an article formed of this green mixture is slowly baked in a supporting bed of coke or the like over a period as long as 10 days. This length of period is felt necessary so that gas will be evolved very slowly during the carbonizing of the binder so that the pressure of the gas does not cause distortion or cracking of the article being baked.

Other alternate methods of manufacture have been proposed to alleviate this long length of baking, but none of them have been wholly satisfactory. For example, one proposed method comprises baking the green mixture in a graphite die under a pressure of more than 1,000 p.s.i. This method is considered unsuitable for the production of graphite products complex in shape or products having internal holes which cannot be economically machined after formation of the graphite article is completed. More satisfactory and more economical methods for the production of graphite products are desired.

It is the principal object of the invention to provide an improved process for making carbonaceous products. Another object is to provide a process for economically making carbonaceous products having good structural characteristics. A further object is to provide an economical process for making graphite products which have complex shapes and/or have internal holes. Still another object is to provide a process for making graphite products within precise dimensional tolerances. These and other objects of the invention are more particularly set forth in the following detailed description of processes embodying various of the features of the invention.

In general, the invention provides a process for making carbonaceous products in which the green article is restrained in such a manner that the time necessary for baking and cooling can be reduced to a period as short as 8 hours without undesirably affecting the structural character of the final graphite product. Restraining of the green articles during baking is accomplished by compacting particulate ceramic material about the green article so that any attempt of the green article to change from its initial dimensions is opposed.

A green article of the particular shape desired is initially formed from a mixture of particulate carbonaceous material and suitable carbonizable binder. Preferably, graphite is used as the carbonaceous material, although amorphous carbon, such as coke, may also be used. The mixture of binder and carbonaceous material should be substantially homogeneous so that its composition and texture is uniform throughout. To assure that the resulting graphite products have good structural strength, the mixture, exclusive of any solvents used, preferably contains between about 70 percent and about 95 percent, by weight, particulate carbonaceous material.

The initial green article can be formed in any suitable manner, molding and extrusion being examples of suitable ways of forming. In many instances extrusion is preferred because it lends itself to the production of articles relatively long in length, i.e., tubes, rods, etc. Extrusion also lends itself to the production of articles which are complex in cross-sectional shape, for example, articles having a plurality of longitudinally extending holes within the wall of a relatively thick-walled tube.

In formulating the mixture for making the green article, the particular forming method which is to be used is considered. Different forming methods may require slightly different composition feed mixtures. In general, graphite flour is the preferred base material. Preferably, graphite flour no larger than about 200 mesh (75 microns) in particle size, is employed. Suitable carbonizable binders and fillers, such as coal tar pitch, ethylcellulose, etc., are added to the carbonaceous material to make up the initial mixture. If the green articles are to be extruded, a suitable lubricant, such as stearic acid is included in the mixture. The fillers and binders may, if desired, be dissolved in a suitable solvent, such as trichloroethylene, to facilitate mixing.

It has been found that by baking the green article under conditions in which any movement of the article is restrained but the article itself is under no significant external pressure, graphite products of superior quality are economically obtained. It has been found that this restraint is preferably applied to the green article by compacting fine particles completely about the article. Compacting is most easily, most economically and most exactly carried out by the use of vibration compacting equipment.

To utilize vibration compacting, a container for the green article is provided which is made of a suitable material that will withstand the temperature whereat the baking will be carried out. The container preferably has a cavity only slightly larger than the outer dimensions of the green article so that there is not an excessive amount of space to be filled by the compacted particles.

Any suitable particulate material which is stable at the temperatures at which baking is to be carried out may be used. The particulate material should not fuse at the contemplated baking temperatures so that it remains easily removable; the material should also be non-reactive with the green article. Ceramic materials are generally suitable, and the term ceramic material is used hereinafter to designate materials which meet the above criteria. Examples of suitable materials include, but are by no means limited to, aluminum oxide, silicon oxide, calcined coke, etc. Compacting the green article in a bed of particulate material also inherently produces a porous media about the article through which the volatiles that will be driven off during baking can easily escape from the green article, an important consideration in producing graphite articles free of structural defects.

To achieve the desired restraining effect, ceramic particles of suitable size are employed. In general, over-size particles are avoided because they may not provide the intimate surface contact with the green article that is desired. Also, ceramic particles which are too small are avoided because of the possibility that they might inhibit gas evolution from the green article. Ceramic particles in the size range between about 840 microns (20 mesh) and about 105 microns (150 mesh) are preferred.

The density of the ceramic particles established by vibration compacting is regulated to substantially eliminate any thermal distortional changes in the green article, or changes as a result of evolving gases, but not so tight as to prevent some slight yielding of the particulate media to accommodate a very slight amount of shrinkage if such should occur in a green article that is tubular or contains internal holes. By restraining any significant movement of the surfaces of the green article during baking, the dimensions of the resultant product are closely controlled. Furthermore, stresses which might otherwise be set up as a result of expansion, especially in articles having holes or cavities, are eliminated. By the elimination of these internal stresses, the probability that cracks may develop in the final product either during later fabrication steps or during actual use are significantly diminished.

Vibration compaction is regulated to pack the particulate ceramic material to a density which gives the desired amount of restraint. In general, vibration compaction, as hereinafter described, provides the compacted particulate mass with a density which is between about 90 percent and about 95 percent of the maximum possible density obtainable with the ceramic material being used, i.e., the density which would be obtained if particles of this material and size were vibrated indefinitely without fracturing the individual particles.

The parameters of the vibration can be varied empirically to accomplish the desired density of compaction. In general, it is convenient to operate the frequency of the vibration at about 60 cycles per second. The amplitude of vibration used is generally higher for green articles of higher weights. Normally, the amplitude is usually on the order of fractions of an inch. Ceramic powder is added throughout the vibration compaction to maintain the desired level in the container. The total length of time, of course, depends upon the length of the green article being restrained. For a green article about three feet in length, vibration compaction is usually completed in about 10 minutes.

Before the green article is placed in the baking container, the bottom of the container is covered with a layer of about 2 inches of ceramic powder. After particulate ceramic material has been compacted about the entire green article, including filling any internal holes, and to a level of a few inches above the top of the green article, a cover is secured to the top of the container to complete the enclosure of the compacted material and prevent movement thereof during baking. Any suitable type of cover, such as a screw type cover, may be employed. The cover may be provided with a movable underplate which can be lowered, as by screwing, into contact with the upper surface of the particulate ceramic material which now fills the interior of the container. Using a cover of this type, sufficient pressure is easily exerted on the top of the packed ceramic particle bed to ensure that the packing remains tight about the green article throughout the baking period.

The closed, packed container is then placed in a suitable furnace, either horizontally or vertically aligned. The temperature controls of the furnace are preferably automatically controllable. Depending upon the particular baking cycle that is selected, the total time of baking lasts between about 8 hours to about 3 days. For commercial production, a cycle of about 24 hours is particularly satisfactory from a worker's standpoint. Typical time and temperatures for such a 24 hour cycle are to raise the temperature of the packed can from room or ambient temperature to about 900° C. in a 17 hour period, bake for 3 hours at a constant temperature of about 900° C., and then cool in the furnace to ambient temperature over about 4 hours.

To provide for the escape of the volatiles that are driven off from the green article during the baking process, the container is provided with some exit means. If a metal container is used, the container is provided with suitable vent holes. If a graphite container is used, graphite of sufficient porosity is employed, between about 0.1 and 1 $cm.^2/sec.$ measured with helium at 20° C. and ½ atmosphere so that the volatiles may escape throughout the pores of the container. In general, the volatiles are produced by the carbonization of the binders and fillers. However, if a carbonaceous material such as raw coke is used, some volatiles will be driven off therefrom also.

From the standpoint of preventing possible internal strains from developing within the article, the temperature range within which most of the volatiles are driven off is a fairly important period. This range lies below about 300° C. Accordingly, in raising the temperature of the packed can to the desired baking temperature, the furnace is controlled so that the rate of temperature increase is preferably held to about 100° C. per hour through this range and preferably until about 400° C. is reached. Another consideration is the gas pressure which may build up within the container so that when a graphite container is used, the above heating rates become more important lest excessive pressure explode a graphite container.

To ensure carbonization is complete, the article is preferably heated at or above a temperature of at least about 800° C. In a process of this type, the temperature which is reached is more important than the time at which the article is held at that temperature. However, to assure that the entire article has reached 800° C. and complete carbonization has been effected, the body is held at 800° C. for at least about 3 hours. More preferably, baking is carried out at a temperature of about 900° C. for about 3 hours.

Although the criteria set forth in the above paragraph are preferred to economically effect carbonization, it should be noted that in a process of this type there is no precise threshold temperature which must be reached before carbonization is effected. As in most of such processes, heating might be carried out at a lower temperature for a longer period to accomplish a similar result. For practical considerations, it is felt that heating should be carried out at at least about 500° C.

At the completion of the baking period, the baked article is cooled to ambient temperature. Cooling may be carried out within the furnace or outside it. The baked article is not normally removed from the container until after it is close to ambient temperature because of the difficulty in handling a hot article.

After cooling is completed, the lid is removed from the end of the container, and the particulate ceramic restraining media is removed by any suitable means. It is convenient to blow a stream of gas or air under pressure into the container to loosen the individual particles and let them fall out into a suitable receptacle wherein they are collected. Any ceramic particles which may stick in smaller holes of the baked article are easily removed by the use of a nylon brush or the like.

At the completion of the cooling and removal of the particulate ceramic material, the baked article is ready to be graphitized if such a step is desired. Graphitization may be carried out at this point even though the particulate carbonaceous material used in the green mixture was graphite flour. Graphitization transforms the carbon deposited from the carbonized fillers and binders into graphite, thus assuring that the entire product is graphitic in form.

Any suitable method of graphitization may be employed. The entire baked article may be heated to about 2600° C. If the carbonized article is elongated in shape, it may be convenient to employ a continuous graphitization furnace wherein a heating zone is maintained at the graphitization temperature and the article is slowly passed through this zone. Examination and testing show that the resultant graphitized products have excellent structural strength, are free from cracks and breaks, and have densities greater than about 1.5 grams per cc. These graphite products are considered well suited for use at elevated temperatures as structural members, including use in high temperature nuclear reactors.

The following examples further illustrate certain features of the present invention.

*Example I*

A multi-holed tube of green material having several holes 0.2 inch in diameter, an outer diameter of 1 inch, and a length of about 3 feet is warm-extruded in a ram extruder.

The extrusion mixture used is made from the following materials:

| | G. |
|---|---|
| GP–38 graphite flour (200 mesh) | 75 |
| Ethylcellulose | 2 |
| Coal tar pitch | 25 |
| Stearic acid | 2 |

In forming the mixture, the ethylcellulose and the pitch are first dissolved in sufficient trichloroethylene and then mixed with the stearic acid in a Hobart mixer before the graphite flour is added. Mixing for about 15 minutes ensures that a uniform mixture is obtained. The mixture is initially dried in a tray drier at about 100° C. to drive off most of the solvent.

The extruded green article is placed in a graphite container having a cylindrical cavity about 2 inches in diameter. Aluminum oxide particles, about 100 mesh, cover the bottom of the cavity to a depth of about 2 inches. After insertion of the green article, the cavity is filled with additional aluminum oxide particles, about 100 mesh, to a level about 2 inches above the top of the green article.

The article-container assembly is then placed on a vibrating table, and vibration is begun. Additional 100 mesh aluminum oxide is added as needed to maintain the upper particle level. The frequency of vibration is set at about 60 cycles per second. After about 10 minutes, the compacted particles of aluminum oxide particles have achieved a density about 90 percent of the maximum possible density, and vibration is halted.

The lid is screwed onto the container, and an underplate carried by the lid is screwed down snugly against the top surface of the ceramic particle bed. The packed container is placed vertically within a wire wound resistance furnace, and heating is begun.

The furnace control is set so that the heat of the green article is increased at about 25° C. per hour for the first 12 hours. At the end of 12 hours, the green article has reached about 400° C. and the rate of heating is increased to about 100° C. per hour. About 5 hours later, the green article reaches 900° C., at which level it is held for the next 3 hours, and then heating is discontinued. Cooling is carried out in the furnace over a period of about 4 hours, employing some slight circulation of air.

At the completion of the cooling period, the lid is removed, and the container is inverted over a suitable receptacle. The restraining particulate aluminum oxide is removed using a piece of copper tubing connected to a source of compressed air. After removal from the container, the carbonized article is closely examined. No cracks or breaks are evident, and the article is free of any apparent bowing. The outer diameter is uniform.

The article is then graphitized by heating the entire tube to a temperature of about 2600° C. Subsequent examination shows that the article is still free from any cracks or breaks. The outer diameter is measured at various locations and measures 1.000±.002 inch. The diameter of the hole measures about 0.2000±.001 inch. The article is considered well suited for use as a structural member at elevated temperatures.

*Example II*

Another three foot long article having the same dimensions is prepared using the same steps set forth in Example I. The article is placed in a stainless steel container and packed in particulate aluminum oxide under conditions similar to those set forth in Example I.

This time an 8-hour baking cycle is employed. The temperature of the packed container is raised to 400° C. over a period of about 4 hours. From 400° C., the temperature is raised to the baking temperature of about 900° C. over a period of about 1½ hours. Baking is carried out at 900° C. for about 1 hour. Heating is then discontinued and cooling to ambient temperature is accomplished in 1½ hours.

The lid is removed, and the particulate aluminum oxide is emptied from the container. Examination of the carbonized article shows that no breaks or cracks have occurred and that the article was free of any apparent bowing. The outer diameter is uniform.

Graphitization is carried out as in Example I and subsequent examination showed that the article is still free from any cracks or breaks. The outer diameter measures 1.000±.002 inch, and the diameter of the hole measures 0.200±.001 inch. The article is considered well suited for use as a structural member in an elevated temperature environment.

*Example III*

Another three foot long article having the same dimensions is prepared using the same steps set forth in Example I. It is likewise packed in a graphite container.

This time a three-day baking cycle is employed. The temperature of the packed container is raised to 400° C. over a period of about 36 hours. From 400° C. the temperature is increased to the baking temperature of about 900° C. over a period of about 15 hours. Baking is carried out at 900° C. for about 9 hours. Heating is then discontinued, and cooling to ambient temperature is carried out over a 12 hour period.

The lid is removed and the particulate aluminum oxide is emptied from the container. Examination of the carbonized article shows that no breaks or cracks have occurred and no bowing is apparent. The outer diameter is uniform.

Graphitization is carried out in a continuous graphitization furnace heated to about 2600° C. Subsequent examination showed that the article is still free from any cracks or breaks. The outer diameter measures 1.000±.002 inch, and the diameter of the holes measure 0.200±.001 inch. The article is considered well suited for use as a structural member in an elevated temperature environment.

Example IV

Another three foot long article having the same dimensions is prepared using the same steps set forth in Example I. The article is placed in a graphite container and surrounded therein with particulate 100 mesh aluminum oxide but no vibration compaction is employed. The lid is secured, and the article-container assembly is placed in the furnace. The same baking cycle as in Example I is carried out over the next 24 hours.

The lid is removed, and the aluminum oxide emptied from the container. The carbonized article is closely examined. Several small cracks appear in the outer surface of the tube.

Graphitization is carried out as in Example I. At the conclusion of graphitization, examination shows that some of the cracks are enlarged and that several more cracks now appear in the surface of the article. When the article is rolled over a flat surface, it is apparent that bowing has occurred. The article is considered unsuitable for many uses as a structural member in an elevated temperature environment. For example, it is considered unsuitable for further treatment to prepare it for use as a part of a nuclear fuel element.

Examples I through IV show that the present invention provides a process for the manufacture of graphite products having structural characteristics which render them especially suitable for use in elevated temperature environments, i.e., above about 500° C. where their integrity is of importance. Whereas previously relatively lengthy periods were necessary to accomplish the carbonization of green articles free from structural defects, the present invention reduces this time to as low as 8 hours. This, itself, is considered a significant economic advance in the art of making graphite products. The significance of the invention is further amplified when it is considered that the close control of the dimensional tolerances minimizes machining costs.

Moreover, the process of the present invention particularly lends itself to the production of graphite products of irregular or complex shapes. For example, elongated products many feet in length and having a plurality of internal bores extending the entire length, although almost prohibitively expensive to machine, can be readily made by this process. The process is also suited to making articles having under cuts. Furthermore, products which are non-uniform in cross section throughout their length, as for example, tubes, or rods which carry various appendages at various locations along their length, can be readily made by this process. The overall economics of the process and its versatility marks it as a significant advance in the making of graphite products.

Whereas the invention has been described with reference to various examples, it should be herein pointed out that the scope of the invention is not limited to these illustrative examples but includes the various modifications which would be considered obvious to one skilled in the art. For example, it is well within the scope of the invention to include additional particles, such as nuclear fuel particles, within the initial green mixture and thus produce graphite fuel compacts for use in nuclear reactors. Therefore, the scope of the invention is defined solely in the claims appended hereto.

Various of the features of the invention are set forth in the following claims.

What is claimed is:

1. In a process for making carbonaceous products, the steps comprising forming a green article containing particulate carbonaceous material and a carbonizable binder, physically restraining the surfaces of said green article by compacting particles of ceramic material in surrounding relation thereabout using vibration compaction, heating and restrained green article to a temperature of at least about 500° C. for sufficient time to carbonize substantially all of said carbonizable binder, and providing for the removal of volatiles driven off from said carbonizable binder during said heating.

2. In a process for making carbonaceous products, the steps comprising forming a green article containing particulate carbonaceous material and a carbonizable binder, physically restraining the surfaces of said green article to inhibit deformation by compacting particulate ceramic material in surrounding relation about said green article using vibration compaction to a density about 90 to about 95 percent of the maximum possible density and heating said restrained green article at a temperature at least about 500° C. over a period sufficient to carbonize substantially all of said carbonizable binder while providing for the removal of volatiles driven off therefrom.

3. In a process for making carbonaceous products, the steps comprising forming a green article containing particulate carbonaceous material and a carbonizable binder, said carbonaceous material being between about 70% and about 95% by weight of said green article, physically restraining the surfaces of said green article to inhibit deformation by compacting ceramic material having a particle size between about 20 mesh and about 150 mesh in surrounding relation about said green article using vibration compaction for about 10 minutes, heating said restrained green article to a temperature of at least about 800° C. and maintaining said temperature for at least about one hour, the temperature being increased to about 300° C. at a rate faster than about 100° C./hour, and during said heating removing volatiles driven off from said carbonizable binder.

4. In a process for making carbonaceous products, the steps comprising forming a green article containing particulate carbonaceous material and a carbonizable binder, physically restraining the surfaces of said green article by compacting particulate ceramic material in surrounding relation thereabout using vibration compacting, heating said restrained green article to a temperature of about 400° C. over a period of about 4 hours and then raising the temperature to at least about 900° C. and baking thereat for at least about one hour, and providing for the removal of volatiles driven off from said carbonizable binder during said heating.

5. In a process for making carbonaceous products, the steps comprising forming a green article containing particulate carbonaceous material and a carbonizable binder, physically restraining the surfaces of said green article to inhibit deformation by compacting particulate ceramic material in surrounding relation about said green article using vibration compaction, heating said restrained green article to a temperature of about 400° C. over a period of about 12 hours, the temperature being increased from about 200° C. to about 300° C. at a rate of about 25° C./hour, increasing the temperature to 900° C. at about 100° C./hour and maintaining the article about 900° C. for at least about 3 hours, removing volatiles driven off from said carbonizable binder, and slowly cooling said baked article to ambient temperature over a period of at least about 4 hours.

6. A process for making graphite products comprising forming a green article containing 200 mesh graphite flour and a carbonizable binder, said graphite flour being between about 70% and 95% by weight of said green article, disposing said green article in a porous graphite container, physically restraining the surfaces of said green article to inhibit deformation by compacting 100 mesh aluminum oxide in surrounding relation about said green article in said container using vibration compaction at about 60 c.p.s. for about 10 minutes, heating said restrained green article to a temperature of about 900° C. and baking said article at said temperature for at least about 3 hours, the temperature being increased to about 400° C. using a rate of increase not greater than about 100° C./hour, removing volatiles driven off from said carbonizable binder during said heating by permitting passage outward through the porous graphite container, slowly cooling said baked article to ambient temperature, removing said particulate aluminum oxide, and graphitizing said baked article.

References Cited

UNITED STATES PATENTS

| | | | |
|---|---|---|---|
| 263,757 | 9/1882 | Brush | 264—105 |
| 263,758 | 9/1882 | Brush | 264—29 |
| 1,036,319 | 8/1912 | Pass et al. | 264—58 X |
| 1,549,867 | 8/1925 | Graveman | 264—29 |
| 1,739,151 | 12/1949 | Johnson | 264—58 |
| 2,529,041 | 11/1950 | Muller | 264—30 X |
| 3,042,594 | 7/1962 | Hauth. | |
| 3,246,056 | 4/1966 | Shea et al. | 264—29 |
| 3,249,964 | 5/1966 | Shaller | 264—29 X |

ROBERT E. WHITE, *Primary Examiner.*

J. A. FINLAYSON, *Assistant Examiner.*